(12) United States Patent  
Yamamoto et al.

(10) Patent No.: US 11,415,428 B2  
(45) Date of Patent: Aug. 16, 2022

(54) AUDIO INFORMATION PROVIDING SYSTEM, CONTROL METHOD, AND NON-TRANSITORY COMPUTER READABLE MEDIUM

(71) Applicant: Nain Inc., Tokyo (JP)

(72) Inventors: Kentaro Yamamoto, Tokyo (JP); Yusuke Takano, Tokyo (JP)

(73) Assignee: NAIN INC., Tokyo (JP)

(*) Notice: Subject to any disclaimer, the term of this patent is extended or adjusted under 35 U.S.C. 154(b) by 246 days.

(21) Appl. No.: 16/809,828

(22) Filed: Mar. 5, 2020

(65) Prior Publication Data

US 2020/0292349 A1  Sep. 17, 2020

(30) Foreign Application Priority Data

Mar. 6, 2019 (JP) ............................ JP2019-041036

(51) Int. Cl.
*G01C 21/26* (2006.01)
*G01C 21/36* (2006.01)

(52) U.S. Cl.
CPC ....... *G01C 21/3629* (2013.01); *G01C 21/265* (2013.01); *G01C 21/3635* (2013.01)

(58) Field of Classification Search
CPC combination set(s) only.
See application file for complete search history.

(56) References Cited

U.S. PATENT DOCUMENTS 8,373,712 B2 * 2/2013 Lim .................... G06F 16/9537  
                                                    345/531  
8,639,518 B2 * 1/2014 Wakaki ............. H04M 1/72448  
                                                    704/275

(Continued)

FOREIGN PATENT DOCUMENTS

| JP | 2003-177033 A | 6/2003 |
| JP | 2009-020091 A | 1/2009 |
| JP | 2018-078398 A | 5/2018 |

OTHER PUBLICATIONS

Japan Patent Office, "Notice of Reasons for Refusal," issued in Japanese Patent Application No. 2019-041036 dated Apr. 26, 2019, 13 pages.

*Primary Examiner* — Peter D Nolan  
*Assistant Examiner* — Anwar Mohamed

(57) ABSTRACT

There is provided an audio information providing system that can solve the problem with the audio lag and includes navigation with higher accuracy. The audio information providing system is an audio guidance system including an audio output device that is worn in the ear of a user and an information processing terminal that is communicatively connected to the audio output device. The audio output device includes: an audio output unit configured to output audio to the ear of the user; and a detection unit configured to detect the direction of the head of the user. The information processing terminal includes: a position information acquiring unit configured to acquire a current position of the user; and a generation unit configured to generate audio data which is used for the audio output unit to output audio guidance for a route to a destination to which the user moves from a direction of the destination relative to the direction of the head of the user on the basis of a relationship among position information of the destination, the current position of the user, and information on the direction of the head of the user.

20 Claims, 10 Drawing Sheets

(56) References Cited

U.S. PATENT DOCUMENTS

| | | | | |
|---|---|---|---|---|
| 8,886,451 | B2* | 11/2014 | Christensen | G01C 21/00 701/409 |
| 9,464,912 | B1* | 10/2016 | Smus | G06F 3/165 |
| 9,594,148 | B2* | 3/2017 | Sumioka | G01C 21/20 |
| 9,612,722 | B2* | 4/2017 | Miller | G01C 21/3664 |
| 9,664,525 | B2* | 5/2017 | Dimitriadis | G01C 21/3664 |
| 10,306,174 | B1* | 5/2019 | Grafton | H04N 21/44222 |
| 10,360,894 | B1* | 7/2019 | Rakshit | G10K 11/17823 |
| 10,390,170 | B1* | 8/2019 | Karkkainen | G06N 20/00 |
| 10,557,716 | B2* | 2/2020 | Grani | G01C 21/206 |
| 10,667,073 | B1* | 5/2020 | Blewett | G06F 3/167 |
| 10,803,859 | B1* | 10/2020 | Williams | G10L 17/22 |
| 11,127,265 | B1* | 9/2021 | Kimchi | G08B 3/10 |
| 11,204,733 | B2* | 12/2021 | Behzadi | G06F 3/0484 |
| 2010/0124947 | A1* | 5/2010 | Sano | H04M 1/72412 455/567 |
| 2014/0058662 | A1* | 2/2014 | Tachibana | G01C 21/20 701/428 |
| 2014/0072154 | A1* | 3/2014 | Tachibana | H04R 5/033 381/309 |
| 2015/0078575 | A1* | 3/2015 | Selig | H04R 1/1025 381/74 |
| 2019/0170533 | A1* | 6/2019 | Jain | H04S 7/304 |
| 2019/0224049 | A1* | 7/2019 | Creasy | G01C 21/3629 |
| 2019/0258865 | A1* | 8/2019 | Ernesti | G06K 9/00771 |
| 2019/0290492 | A1* | 9/2019 | Hendrix | G06F 3/165 |
| 2019/0378491 | A1* | 12/2019 | Mohammad | G10K 11/17827 |
| 2020/0059747 | A1* | 2/2020 | Engle | H04W 4/024 |
| 2020/0142667 | A1* | 5/2020 | Querze | G06F 3/012 |
| 2020/0186926 | A1* | 6/2020 | Park | H04M 1/725 |
| 2020/0228914 | A1* | 7/2020 | Engle | H04R 1/40 |
| 2020/0264006 | A1* | 8/2020 | Sommer | G01C 21/3629 |
| 2020/0366990 | A1* | 11/2020 | Goo | H04R 5/033 |
| 2021/0067863 | A1* | 3/2021 | Shinmen | H04R 1/1008 |
| 2021/0102819 | A1* | 4/2021 | Gallo | G01C 21/3629 |
| 2021/0337330 | A1* | 10/2021 | Disatnik | H04M 1/24 |

* cited by examiner

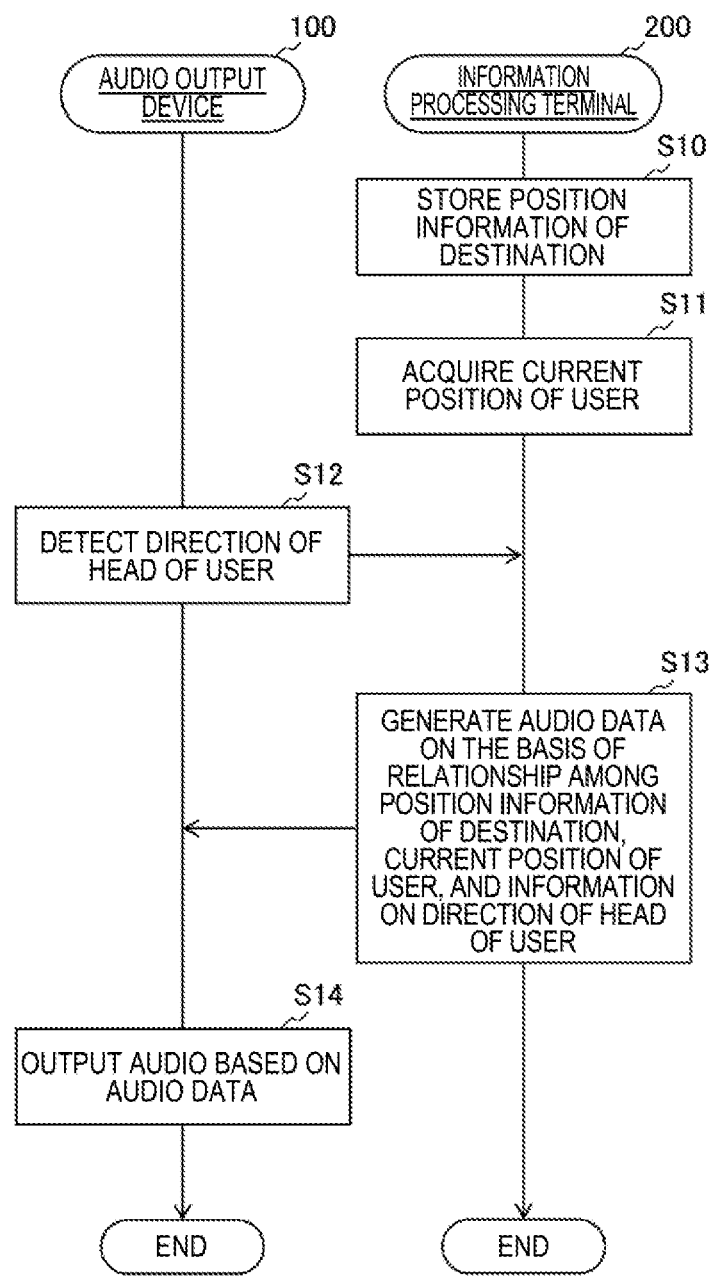

| DATE | TIME | ROTATION OF HEAD | ACCELERATION | MOVING DISTANCE | POSITION INFORMATION | ... |
|---|---|---|---|---|---|---|
| dd/mm/yy | HH:mm | $\theta$ | A | h | LATITUDE: LONGITUDE: | |
| | | | | | | |
| | | | | | | |
| ⋮ | ⋮ | | | | | |

TB20

| ACCELERATION | MOVING DISTANCE | POSITION INFORMATION | ... |
|---|---|---|---|
| AA | hh | LATITUDE: LONGITUDE: | |
| | | | |
| | | | |
| | | | |

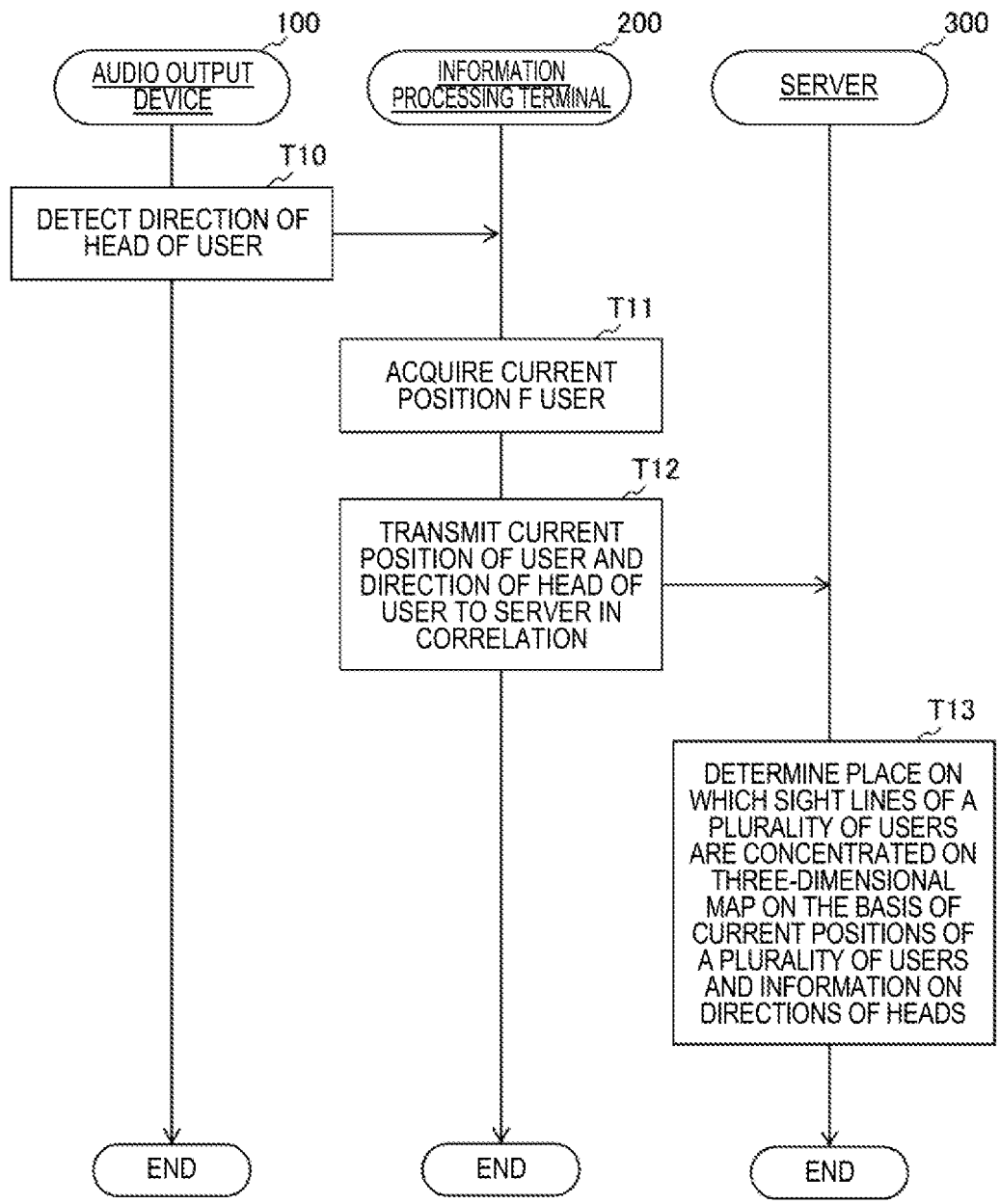

AUDIO INFORMATION PROVIDING SYSTEM, CONTROL METHOD, AND NON-TRANSITORY COMPUTER READABLE MEDIUM

BACKGROUND OF THE INVENTION

Field of the Invention

The invention relates to an audio information providing system, a control method for an information processing terminal, a control program for an information processing terminal, a control method for an audio output device, and a control program for an audio output device, and more particularly to an audio information providing system using a hearable device which is worn in a user's ear, or the like.

Description of Related Art

Recently, hearable devices, which are wearable devices worn in the ear, have seen remarkable development. A hearable device is typically realized as an earphone type device into which a microphone is incorporated and which has a radio communication function and is a device that can transmit and receive data to and from an information processing terminal, a cloud server, or the like by radio communication (for example, see Non Patent Document 1).

Currently, a hearable device that can provide an assistant function corresponding to a user's situation is being proposed (for example, see Patent Document 1). Patent Document 1 describes navigation using a hearable device.

Patent Documents

[Non-Patent Document 1] "APPROACH AND PROSPECT OF HUMAN-BASED IoT SOLUTION BY HEARABLE TECHNOLOGY," NIPPON ELECTRIC Co., Ltd, [online] NEC Technical Report Vol. 70 No. 1 (September, 2017), September, 2017 [retrieved Nov. 5, 2018], Internet <https://jpn.nec.com/techrep/journal/g17/n01/170110.html>

[Patent Document 1] Japanese Unexamined Patent Application Publication No. 2018-78398

SUMMARY OF THE INVENTION

In the related art, information on a user which is acquired by a hearable device such as the user's speech and a direction, a posture, a moving direction, and acceleration of the user's head is transmitted from the hearable device to an information processing terminal (for example, a smartphone) carried by the user and is subjected to data processing by the information processing terminal, and then audio data which is a result of processing is transmitted to and played by the hearable device. Accordingly, a time lag due to the series of processes occurs between acquisition of the information on the user and playing of the audio data in the hearable device. When navigation by the hearable device is realized as described in Patent Document 1, there is a problem in that navigation accuracy decreases due to an audio lag based on the time lag.

Therefore, the invention provides an audio information providing system that can solve the problem with the audio lag and includes navigation with higher accuracy.

According to an embodiment of the invention, there is provided an audio information providing system which is an audio guidance system including an audio output device that is worn in the ear of a user and an information processing terminal that is communicatively connected to the audio output device, wherein the audio output device includes: an audio output unit configured to output audio to the ear of the user; and a detection unit configured to detect a direction of the head of the user, and wherein the information processing terminal includes: a position information acquiring unit configured to acquire a current position of the user; and a generation unit configured to generate audio data which is used for the audio output unit to output audio guidance for a route to a destination to which the user is moving from a direction of the destination relative to the direction of the head of the user on the basis of a relationship among position information of the destination, the current position of the user, and information on the direction of the head of the user.

In the audio information providing system according to the embodiment of the invention, the information processing terminal may further include a prediction unit configured to predict a stop position of a change of the direction of the head when the detection unit detects the start of the change of the direction of the head of the user, and the generation unit may be configured to generate the audio data using information on the stop position predicted by the prediction unit as the information on the direction of the head of the user.

In the audio information providing system according to the embodiment of the invention, the prediction unit may be configured to predict the stop position of a change of the direction of the head on the basis of learning data associated with the direction of the head of the user which is stored in a predetermined storage device.

In the audio information providing system according to the embodiment of the invention, the generation unit may be configured to generate the audio data additionally on the basis of information on a movement direction of the user.

In the audio information providing system according to the embodiment of the invention, the generation unit may be configured to generate the audio data in which content of the audio guidance is changed on the basis of the direction of the head of the user acquired from the detection unit and information on a movement direction of the user.

In the audio information providing system according to the embodiment of the invention, the generation unit may be configured to generate the audio data on the basis of information on the current position of the user and a direction of a sight line of the user based on information on the direction of the head of the user detected by the detection unit when the sight line of the user is directed to a predetermined point for a predetermined time or more.

In the audio information providing system according to the embodiment of the invention, the information processing terminal may further include a reception unit configured to receive information on external audio data associated with a predetermined external service, and the generation unit may be configured to select the external audio data as the audio data which is output from the audio output unit on the basis of the direction of the head of the user.

In the audio information providing system according to the embodiment of the invention, the information processing terminal may further include a transmission unit configured to transmit the position information of the user and the information on the direction of the head of the user in the position information to a predetermined information processing device in correlation with each other, and the predetermined information processing device may include a determination unit configured to determine a place on which sight lines of a plurality of users are concentrated on a three-dimensional map on the basis of the position information of the plurality of users and the information on the directions of the heads thereof.

According to another embodiment of the invention, there is provided a control method for an information processing terminal that is communicatively connected to an audio output device including an audio output unit configured to output audio to the ear of a user and a detection unit configured to detect a direction of the head of the user, the control method causing the information processing terminal to perform: a step of acquiring a current position of the user; and a step of generating audio data which is used for the audio output unit to output audio guidance for a route to a destination to which the user moves from a direction of the destination relative to the direction of the head of the user on the basis of a relationship among position information of the destination, the current position of the user, and information on the direction of the head of the user.

According to another embodiment of the invention, there is provided a control program for an information processing terminal that is communicatively connected to an audio output device including an audio output unit configured to output audio to the ear of a user and a detection unit configured to detect a direction of the head of the user, the control program causing the information processing terminal to perform: a position information acquiring function of acquiring a current position of the user; and a generation function of generating audio data which is used for the audio output unit to output audio guidance for a route to a destination to which the user moves from a direction of the destination relative to the direction of the head of the user on the basis of a relationship among position information of the destination, the current position of the user, and information on the direction of the head of the user.

According to another embodiment of the invention, there is provided a control method for an audio output device that is worn in the ear of a user and is communicatively connected to an information processing terminal, the control method causing the audio output device to perform: a step of outputting audio to the ear of the user; and a step of detecting a direction of the head of the user, wherein the step of outputting audio includes outputting audio based on audio data which is used to output audio guidance for a route to a destination to which the user moves from a direction of the destination relative to the direction of the head of the user and which is generated by the information processing terminal on the basis of a relationship among position information of the destination, a current position of the user, and information on the direction of the head of the user.

According to another embodiment of the invention, there is provided a control program for an audio output device that is worn in the ear of a user and is communicatively connected to an information processing terminal, the control program causing the audio output device to perform: an audio output function of outputting audio to the ear of the user; and a detection function of detecting a direction of the head of the user, wherein the audio output function includes outputting audio based on audio data which is used to output audio guidance for a route to a destination to which the user moves from a direction of the destination relative to the direction of the head of the user and which is generated by the information processing terminal on the basis of a relationship among position information of the destination, a current position of the user, and information on the direction of the head of the user.

According to the invention, it is possible to provide an audio information providing system that includes navigation with higher accuracy.

BRIEF DESCRIPTION OF THE DRAWINGS

FIG. 4 is a diagram illustrating a sequence of processes which are performed by an audio output device and an information processing terminal in the audio information providing system according to the first embodiment of the invention;

FIG. 7 is a diagram illustrating an example of learning data in the audio information providing system according to the second embodiment of the invention;

FIG. 10 is a diagram illustrating a sequence of processes which are performed by an audio output device, an information processing terminal, and a server in an audio information providing system according to a fifth embodiment of the invention.

DETAILED DESCRIPTION OF THE INVENTION

Hereinafter, embodiments of the invention will be described in detail with reference to all the accompanying drawings.

System Configuration

Figure 1:
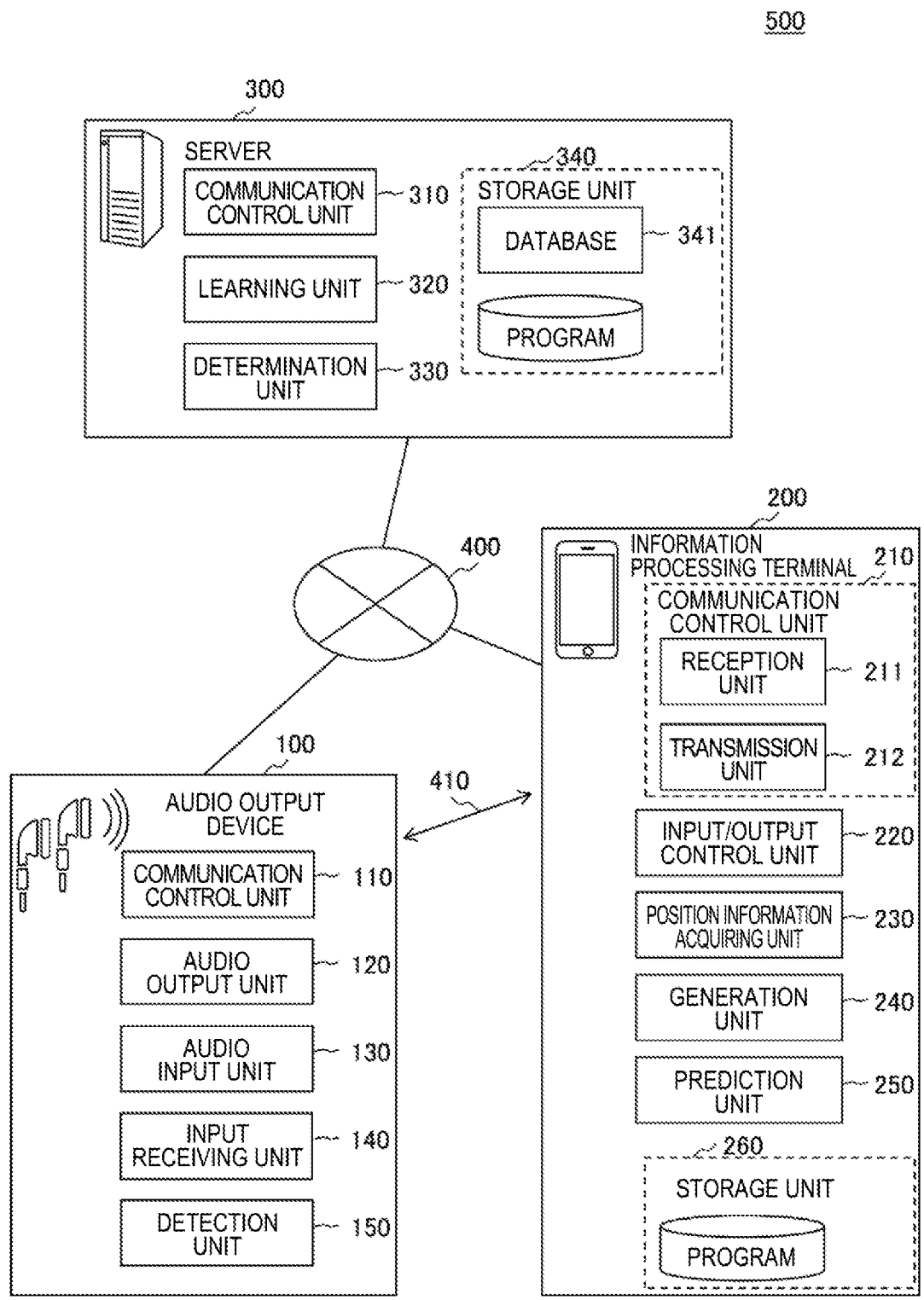
FIG. 1 is a diagram schematically illustrating a configuration of an audio information providing system according to an embodiment of the invention.

FIG. 1 is a diagram schematically illustrating a configuration of an audio information providing system according to an embodiment of the invention. As illustrated in FIG. 1, an audio information providing system 500 includes an audio output device 100, an information processing terminal 200, and a server 300 which are connected to each other via a network 400. The audio output device 100 is typically realized as an earphone which can be worn in the ear of a user. The audio output device 100 is communicatively connected to the information processing terminal 200 by short-range radio communication 410 such as Bluetooth (registered trademark) or by a wired cable which is not illustrated. The audio output device 100 may have a configuration in which right and left headphones are coupled to each other by a head band, a configuration in which right and left earphones are connected to each other by a wired cable, or a configuration in which right and left earphones are not connected to each other by a wired cable and can communicate independently with the information processing terminal 200. The audio output device 100 may communicate with the server 300 via the network 400.

The information processing terminal 200 is not particularly limited as long as it is an information processing device that can realize functions or methods which are described in the following description. The information processing terminal 200 may include, for example, a smartphone, a mobile phone (a feature phone), a small computer device (for example, a personal digital assistant (PDA)), or a wearable terminal (for example, an eyeglass type device or a watch type device) and is preferably able to be carried by the user. The information processing terminal 200 is connected to the audio output device 100 in a wireless or wired manner and transmits and receives various types of information including audio data to and from the audio output device 100. The information processing terminal 200 has an application program for providing a predetermined service installed therein and executes the application program in accordance with the user's instruction. The predetermined service includes, for example, a navigation (route guidance) service, an audio conversation service, a weather forecast service, and a news information providing service.

The network 400 may include a radio network or a wired network. Specifically, examples of the network 400 include a wireless LAN (WLAN), a wide area network (WAN), integrated service digital networks (ISDNs), wireless LANs, Long Term Evolution (LTE), LTE-Advanced, 4th generation (4G), 5th generation (5G), and code division multiple access (CDMA). The network 400 is not limited to such examples and may be, for example, a public switched telephone network (PSTN), Bluetooth (registered trademark), an optical communication line, an asymmetric digital subscriber line (ADSL), or a satellite communication network. The network 400 may be a combination thereof.

The server 300 is typically embodied on a cloud. The server 300 has a function of an application server and performs various processes in response to a request from an application program which is installed in the information processing terminal 200. The server 300 transmits and receives information in accordance with the user's instruction which is transmitted from the audio output device 100 or the information processing terminal 200 via the network 400. Only one server 300 is illustrated in FIG. 1, but a plurality of servers 300 may be provided. The server 300 receives and stores information on users of a plurality of information processing terminals 200 from the plurality of information processing terminals 200 (and audio output devices 100 connected to the information processing terminals 200).

Hardware Configuration

Figure 2:
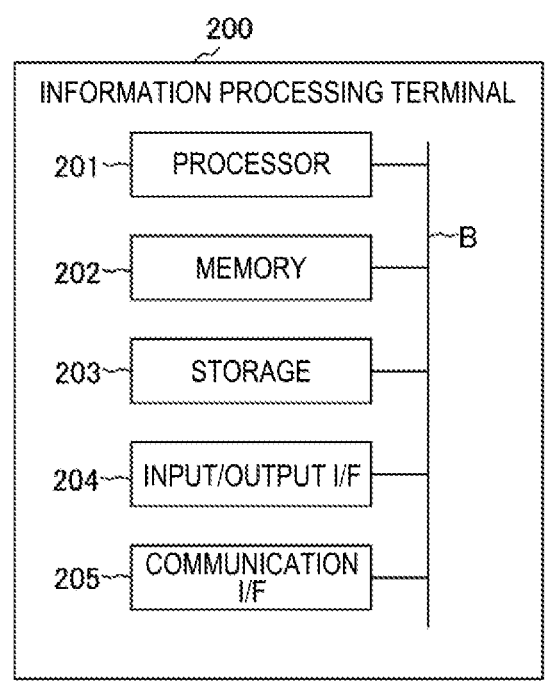
FIG. 2 is a diagram illustrating a hardware configuration of an information processing terminal according to an embodiment of the invention.

A hardware configuration of an information processing terminal 200 which is included in the audio information providing system 500 will be described below with reference to FIG. 2. The information processing terminal 200 includes a processor 201, a memory 202, a storage 203, an input/output interface (input/out I/F) 204, and a communication interface (communication I/F) 205. These elements are connected to each other via a bus B.

The information processing terminal 200 realizes functions and methods according to this embodiment by the processor 201, the memory 202, the storage 203, the input/output I/F 204, and the communication I/F 205 in cooperation.

The processor 201 performs functions and/or methods which are realized in accordance with codes or commands included in a program which is stored in the storage 203. The processor 201 may include, for example, a central processing unit (CPU), a micro-processing unit (MPU), a graphics processing unit (GPU), a microprocessor, a processor core, a multiprocessor, an application-specific integrated circuit (ASIC), or a field programmable gate array (FPGA), and may realize processes which are described in embodiments using logical circuits (hardware) or dedicated circuits which are formed in an integrated circuit (IC) or a large scale integration (LSI). These circuits may be embodied by one or more integrated circuits or a plurality of processes described in the embodiment may be embodied by a single integrated circuit. An LSI may be referred to as a VLSI, a super LSI, an ultra LSI, or the like depending on a difference in a degree of integration.

The memory 202 temporarily stores a program which is loaded from the storage 203 and provides a work area to the processor 201. Various types of data which are generated while the processor 201 is performing a program are temporarily stored in the memory 202. The memory 202 includes, for example, a random access memory (RAM) and a read only memory (ROM).

The storage 203 stores a program. The storage 203 includes, for example, a hard disk drive (HDD), a solid state drive (SSD), or a flash memory.

The communication I/F 205 is mounted as hardware such as a network adaptor, communication software, and a combination thereof and transmits and receives various types of data via the network 400. This communication may be performed in one of wired and wireless manners and employ any communication protocol as long as mutual communication can be performed. The communication I/F 205 performs communication with another information processing device via the network 400. The communication I/F 205 transmits various types of data to another information processing device in accordance with an instruction from the processor 201. The communication I/F 205 receives various types of data which is transmitted from another information processing device and transmits the received data to the processor 201.

The input/output I/F 204 includes an input device that is used to input various operations to the information processing terminal 200 and an output device that is used to output results of processes which are performed by the information processing terminal 200. In the input/output I/F 204, the input device and the output device may be unified or the input device and the output device may be separated from each other.

The input device is embodied by any type of device that can receive an input from the user and transmit information associated with the input to the processor 201 or a combination thereof. The input device includes, for example, hardware keys such as a touch panel, a touch display, and a keyboard, a pointing device such as a mouse, a camera (an operation input using an image), and a microphone including the audio output device 100 (an operation input using audio).

The output device outputs results of processes which are performed by the processor 201. The output device includes, for example, a touch panel, and a speaker which is an audio output unit 120 of the audio output device 100. The server 300 may be configured with the hardware configuration illustrated in FIG. 2.

Functional Configuration (1) Audio Output Device

Referring back to FIG. 1, the functional configurations of the devices will be described below in brief. As illustrated in FIG. 1, the audio output device 100 includes at least a communication control unit 110, an audio output unit 120, an audio input unit 130, a input receiving unit 140, and a detection unit 150. The communication control unit 110 controls radio communication via the network 400, that is, short-range radio communication with the information processing terminal 200, or communication with the server 300 or an external device which is not illustrated. The audio output unit 120 serves as a speaker that outputs audio to the ear of the user. The audio input unit 130 serves as a microphone that receives audio which is uttered by the user. In the audio output device 100, the user can perform inputting of a command to the information processing terminal 200 by speech or conversation with the information processing terminal 200 via the audio input unit 130. The input receiving unit 140 has a function of receiving an operation input by the user's finger and may be embodied by, for example, buttons, a touch panel, or dial buttons. The input receiving unit 140 may not be integrated with the audio output device 100, and inputting of a command to the audio output device 100 may be performed via the information processing terminal 200. The audio output device 100 may include a display which is not illustrated.

The detection unit 150 has a function of detecting a direction of the head of the user who wears the audio output device 100 and includes, for example, a gyro sensor and a geomagnetic sensor. The detection unit 150 includes an acceleration sensor that detects a rotation speed of the head of the user. According to an embodiment of the invention, when the audio output device 100 including these various sensors is worn in the user's ear, a direction or a position of the head of the user can be accurately measured.

The audio output device 100 may include a storage unit which is not illustrated, and information (for example, a PIN code) required for connection to the information processing terminal 200 may be stored therein.

(2) Functional Configuration of Information Processing Terminal

The information processing terminal 200 includes a communication control unit 210, an input/output control unit 220, a position information acquiring unit 230, a generation unit 240, a prediction unit 250, and a storage unit 260. The communication control unit 210 includes a reception unit 211 and a transmission unit 212, and has a function of performing radio communication with the audio output device 100, the server 300, and an external device which is not illustrated. The input/output control unit 220 controls transmission of various types of information with an external device via the input/output I/F 204. For example, the input/output control unit 220 transmits information to the functional units in accordance with an input instruction from a user via the input device such as the touch panel, the keyboard, or the microphone which is the audio input unit 130 of the audio output device 100, or transmits information from the functional units to the output device such as the touch panel, the monitor, or the speaker which is the audio output unit 120 of the audio output device 100.

The position information acquiring unit 230 has a function of acquiring position information of the information processing terminal 200. The position information acquiring unit 230 acquires position information of the information processing terminal 200 on the basis of information from Global Positioning System (GPS) satellites or base stations which are not illustrated. The position information may be the latitude and longitude of a position at which the information processing terminal 200 is located, or information on an installation position of a base station close to the information processing terminal 200 may be acquired using a communication system such as a wireless LAN such as Wi-Fi, an indoor messaging system (IMES), a radio frequency identifier (RFID), or Bluetooth low energy (BLE). The position information acquiring unit 230 may measure the position information, for example, using a mobile communication system such as LTE or CDMA. Acquisition of the position information may be performed at intervals of a predetermined time (for example, 3 minutes or 10 minutes) or may be performed whenever necessary. Acquisition of the position information may be performed by the audio output device 100.

The generation unit 240 generates audio data which is output from the audio output device 100. According to one embodiment of the invention, audio can be output such that a user wearing the audio output device 100 hears the audio in an arbitrary direction. That is, the generation unit 240 generates audio data such that a user three-dimensionally hears sound. Accordingly, with the audio information providing system according to one embodiment of the invention, for example, a sense that a virtual sound source is located on the right-rear side of a user and sound is heard from the virtual sound source can be given to the user. This can be achieved, for example, by generating audio data in which a sound volume of audio which is output from right and left earphones of the user is changed on the basis of a difference in distance between the virtual sound source and the right and left earphones of the user. A known technique can be used as a technique for realizing stereophony of sound.

The storage unit 260 has a function of storing various types of programs or various types of data which are required for the information processing terminal 200 to operate in the storage 203 or the like. For example, the storage unit 260 stores information on a destination of a user when the user performs route guidance which is an application program. The storage unit 260 may store a past behavior history of a user.

(3) Functional Configuration of Server

The server 300 includes a communication control unit 310, a learning unit 320, a determination unit 330, and a storage unit 340. The communication control unit 310 controls communication between the server 300 and an external device via the network 400. The learning unit 320 extracts features associated with movement of the head of the user by learning using information on the direction of the head of the user acquired from a gyro sensor, a geomagnetic sensor, or an acceleration sensor (the detection unit 150) of the audio output device 100 and other information on the user. For example, machine learning (supervised learning) can be used for the learning by the learning unit 320. The determination unit 330 determines a place on which sight lines of a plurality of users are concentrated on a three-dimensional map on the basis of a relationship between position information and information on directions of the heads of the users in the position information, which is received and accumulated from the plurality of users (details will be described later).

An audio information providing system according to a first embodiment of the invention will be described below with reference to FIG. 3. In the first embodiment, audio information on route information to a destination is provided to a user.

Figure 3:
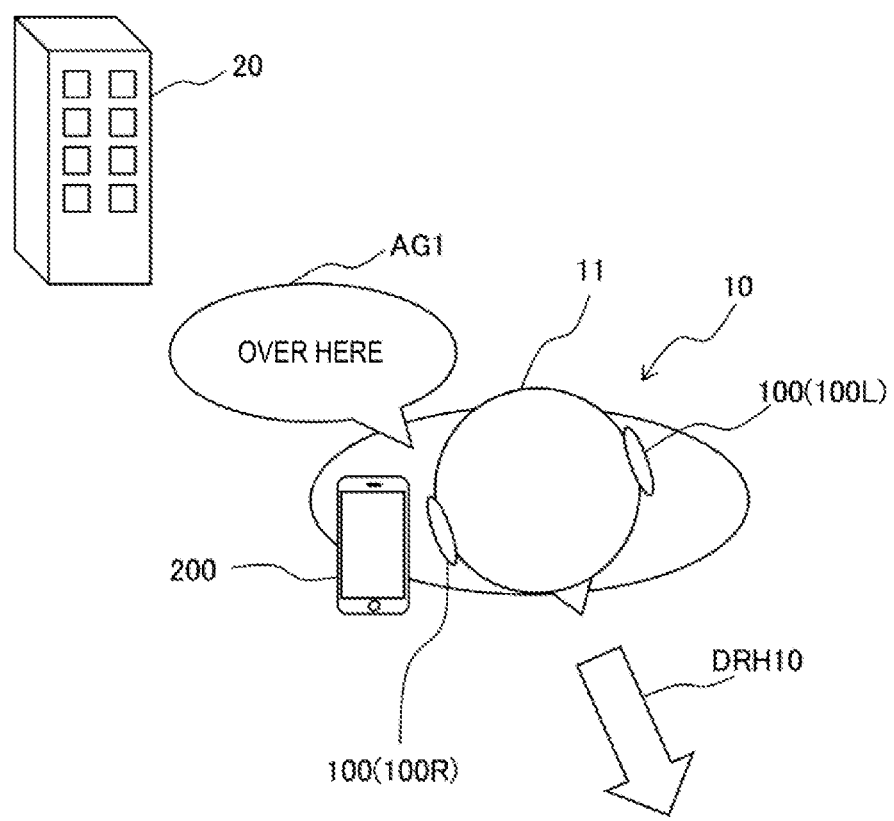
FIG. 3 is a diagram schematically illustrating an audio information providing system according to a first embodiment of the invention.

In FIG. 3, the user 10 wears the audio output device 100 on the head 11 of the user. In the following description, earphones are exemplified as the audio output device 100, and a left earphone is denoted by 100L and a right earphone by 100R. In an information processing terminal 200 which is carried by the user 10, an application program for providing a route guidance service is started and a destination 20 is set as the destination of the user 10.

The detection unit 150 of the audio output device 100 detects that the direction of the head of the user 10 is a direction DRH10 on the basis of a gyro sensor or a geomagnetic sensor. The position information acquiring unit 230 of the information processing terminal 200 acquires information on a current position of the user 10. The generation unit 240 generates audio data for performing audio guidance on a route on the basis of a relationship among the position information of the destination 20, the current position of the user 10, and information on the direction of the head of the user 10. At this time, the generation unit 240 generates audio data for outputting audio guidance from the direction of the destination 20 relative to the direction of the head DRH10 of the user 10. In the example illustrated in FIG. 3, audio data in which audio information AG1 "over here" seems to be heard from a direction in which the destination 20 is located relative to the head 11 of the user is generated by the generation unit 240.

The first embodiment of the invention described above will be described below with reference to the sequence diagram illustrated in FIG. 4. FIG. 4 is a sequence diagram illustrating a sequence of processes which are performed by the audio output device 100 and the information processing terminal 200 in the first embodiment.

First, in the information processing terminal 200, for example, an application program for route guidance is started and position information of a destination is stored (Step S10). Then, the position information acquiring unit 230 of the information processing terminal 200 starts acquiring information on a current position of a user (Step S11). The detection unit 150 of the audio output device 100 detects a direction of the head of the user (Step S12). Information on the detected direction of the head of the user is transmitted to the information processing terminal 200. The generation unit 240 of the information processing terminal 200 generates audio data on the basis of a relationship among the position information of the destination, the current position of the user, and the information on the direction of the head of the user (Step S13). The generated audio data is transmitted to the audio output device 100. The audio output unit 120 of the audio output device 100 outputs audio based on the audio data (Step S14).

According to the first embodiment of the invention described above, information on a destination of a user is output from a direction in which the destination is located relative to the user by the audio output device 100. Accordingly, it is possible to appropriately inform the user of the direction of the destination. The audio output device 100 which is a hearable device, for example, does not need to be visually checked by the user, and thus a user does not need to "use a smartphone while walking," which is safe.

The above sequence may be performed when information on a user satisfies predetermined conditions. An example of the case in which information on a user satisfies predetermined conditions is a case in which a user stops for a predetermined time or more. In this case, since the user is thought to have stopped because the user is not aware of a moving direction, audio guidance associated with a route can be output at a time which is appropriate for the user. Alternatively, the above sequence may be performed in accordance with an input instruction or an audio instruction from the user.

Figure 5A:
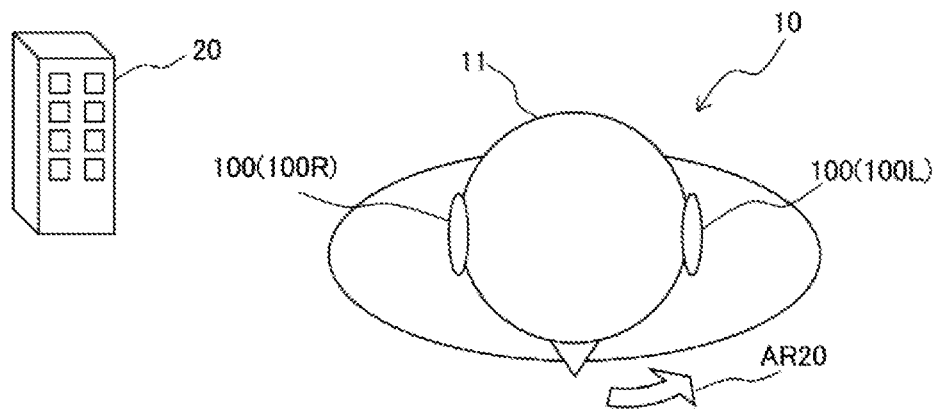
FIGS. 5A to 5C are diagrams schematically illustrating an audio information providing system according to a second embodiment of the invention.
Figure 5B:
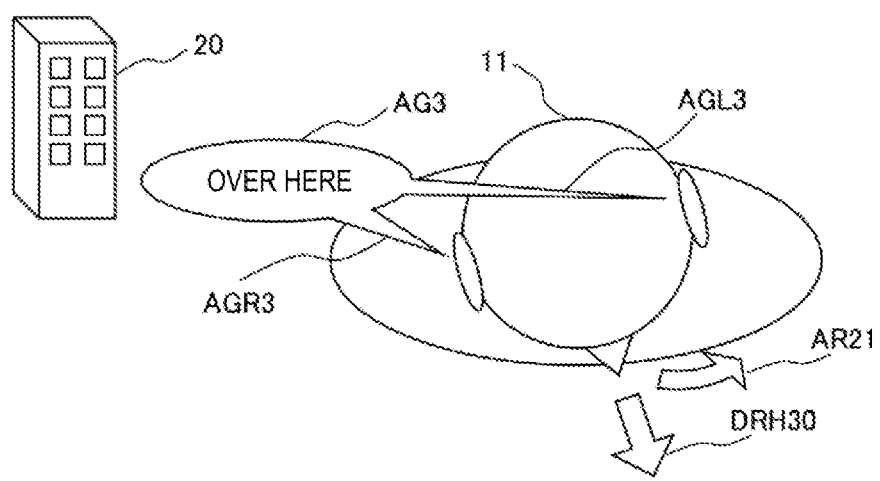
Figure 5C:
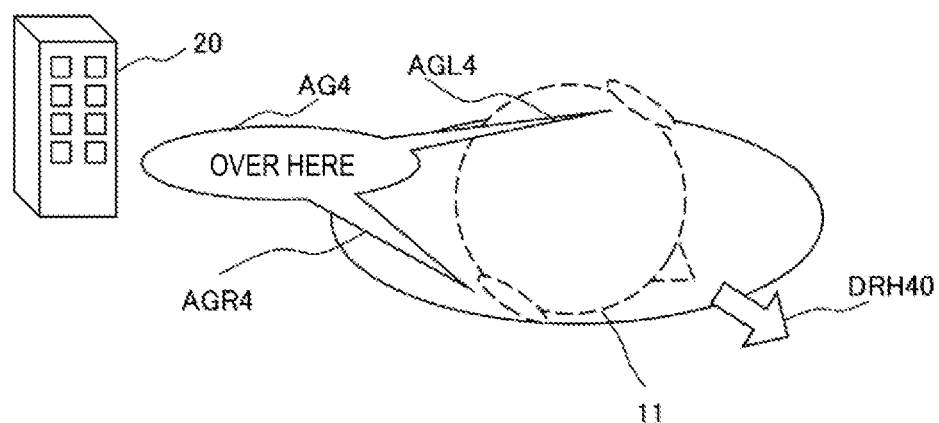

A second embodiment of the invention will be described below with reference to FIGS. 5A to 7. FIGS. 5A to 5C are diagrams illustrating an audio information providing system according to the second embodiment.

In the second embodiment, the prediction unit 250 of the information processing terminal 200 predicts a stop position of a change in the direction of the head of the user when the change in the direction of the head of the user is detected by the audio output device 100. Then, the generation unit 240 generates audio data using information on the stop position predicted by the prediction unit 250 as information on the direction of the head of the user.

In the example illustrated in FIGS. 5A to 5C, as illustrated in FIG. 5A, the user 10 starts rotation of the head 11a of the user and the detection unit 150 (an acceleration sensor) of the audio output device 100 detects the change in the direction of the head on the basis of acceleration AR20. Here, as illustrated in FIG. 5B, while the head 11 of the user is rotating, it is assumed that audio guidance AG3 of the destination 20 is generated on the basis of a relationship among the direction DRH30 of the head 11 of the user, the current position of the user 10, and the position information of the destination 20 when the head 11 of the user continues to rotate, and the audio guidance AG3 is output from the audio output device 100. That is, in the audio guidance AG3, audio data AGL3 and AGR3 which is output to the right and left earphones is generated on the basis of the relative relationship between the direction DRH30 and the destination 20. However, when the head 11 of the user continues to rotate and audio data is output from the audio output device 100, the head 11 of the user may depart from the position illustrated in FIG. 5B due to a time lag which is generated in data processing and transmission and reception of data between devices. When the head 11 of the user is not located at the position illustrated in FIG. 5B and audio guidance which is generated on the basis of the position illustrated in FIG. 5B is output, audio guidance is heard from a direction departing from the relative position between the head 11 of the user and the destination 20 and an audio lag occurs.

According to the second embodiment of the invention, in order to prevent the audio lag due to the time lag, the prediction unit 250 predicts the stop position of the head 11, and audio data is generated on the basis of the predicted stop position. In the example illustrated in FIGS. 5A to 5C, the rotation of the head stops at the position of the head 11 (direction DRH40) illustrated in FIG. 5C in the future. In this case, the prediction unit 250 predicts that the head 11 of the user 10 stops at the position (direction DRH40) illustrated in FIG. 5C on the basis of the acceleration of the head of the user 10 in any one of FIGS. 5A and 5B. The generation unit 240 generates audio data AG4 (that is, audio data AGL4 and AGR4 which is to be output from the right and left earphones) on the basis of the predicted position of the head.

Machine learning based on information on past behavior of the user can be used as a prediction method by the prediction unit 250. FIG. 7 illustrates an example of a table in which information on past behavior of the user is recorded. As illustrated in FIG. 7, a date, a time, a rotational angle, acceleration, and a moving distance (a rotational distance) of the head, and position information for a certain user are stored as a table TB10. The learning unit 320 of the server 300 predicts future behavior by machine learning based on information of the past behavior. For example, the learning unit 320 outputs a data table TB20 in which the moving distance is "hh" when the acceleration of the head of the user is "AA." Data stored in the tables is not limited to the data illustrated in the drawing, and the illustrated data is not essential. Learning may be performed in the information processing terminal 200.

Figure 6:
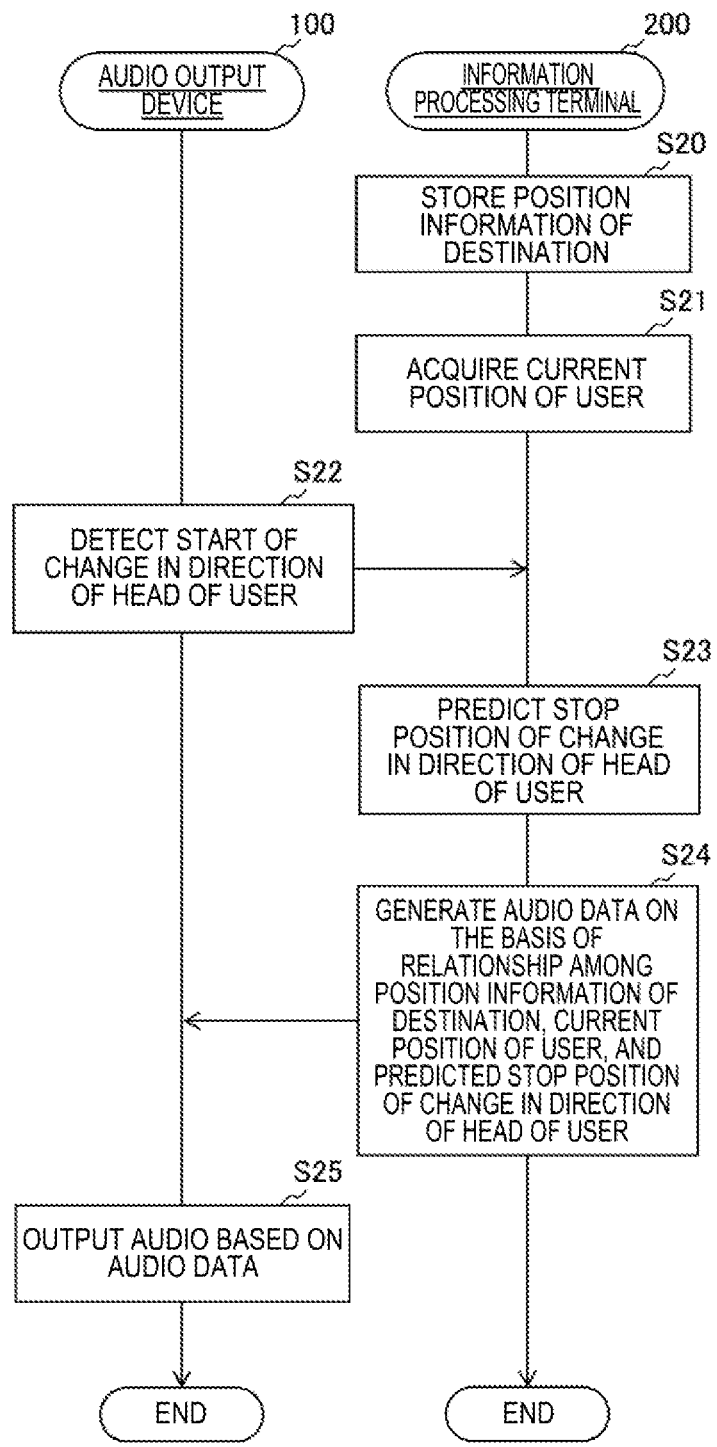
FIG. 6 is a diagram illustrating a sequence of processes which are performed by an audio output device and an information processing terminal in the audio information providing system according to the second embodiment of the invention.

FIG. 6 is a sequence diagram illustrating a sequence of processes which are performed by the audio output device 100 and the information processing terminal 200 in the embodiment. First, in the information processing terminal 200, for example, an application program associated with route guidance is started and position information of a destination is stored (Step S20). Then, the position information acquiring unit 230 of the information processing terminal 200 starts acquiring information on the current position of the user (Step S21). The detection unit 150 of the audio output device 100 detects the start of a change in the direction of the head of the user (Step S22). Information on the detected change in the direction of the head of the user is transmitted to the information processing terminal 200. The prediction unit 250 of the information processing terminal 200 predicts a stop position of the change in the direction of the head of the user on the basis of the received information on the change in the direction of the head (Step S23). The generation unit 240 of the information processing terminal 200 generates audio data on the basis of a relationship among the position information of the destination, the current position of the user, and the stop position predicted as the information on the direction of the head of the user (Step S24). The generated audio data is transmitted to the audio output device 100. The audio output unit 120 of the audio output device 100 outputs audio based on the audio data (Step S25).

According to the second embodiment of the invention described above, information on a destination of a user is output from the direction in which the destination is located relative to the user by the audio output device 100 without causing an audio lag. Accordingly, it is possible to provide information with higher accuracy to the user.

The generation unit 240 may additionally use information on movement of a user to generate audio data. Information on movement of a user includes a moving speed and a movement direction of the user. For example, the moving speed of the user or the movement direction of the user can be calculated from a change of the position information of the user in the information processing terminal 200. For example, when the moving speed of the user is faster than a predetermined speed, the user is thought to move by a movement means such as a vehicle or a train. In this case, the prediction unit 250 predicts a position at which the user alights from the movement means on the basis of the destination of the user, route information, or the like. The generation unit 240 may generate audio data on the basis of information at the predicted alighting position. With this configuration, it is possible to provide audio information which is suitable for the user's situation.

Figure 8:
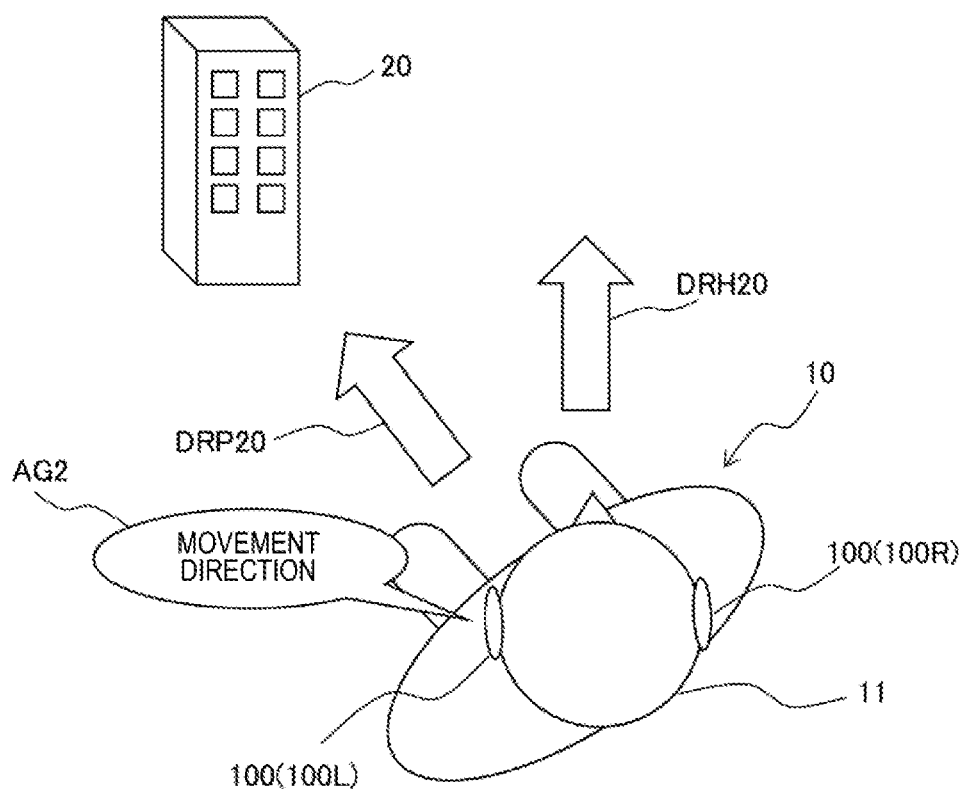
FIG. 8 is a diagram schematically illustrating an audio information providing system according to a third embodiment of the invention.

A third embodiment of the invention will be described below with reference to FIG. 8. According to the third embodiment, the generation unit 240 generates audio data in which details of audio guidance are changed on the basis of information on the direction of the head of the user and the movement direction of the user. In the example illustrated in FIG. 8, a user 10 moves in a direction DRP20 toward a destination 20 and a head 11 of the user 10 faces a direction DRH20 which is different from the direction of the destination 20. In this case, the generation unit 240 generates, for example, audio guidance with details for mentioning the movement direction (audio guidance AG2 "movement direction" in the example illustrated in FIG. 8). This audio guidance is generated such that it is heard from the direction of the destination 20 relative to the direction DRH20 of the head of the user. On the other hand, when the movement direction of the user 10 is opposite to the direction of the destination 20, audio guidance "reverse direction" may be generated.

Since a hearable device does not require the user's motion of ascertainment of a map, it may be considered that the user feels uncomfortable about whether the movement direction is correct. With the above configuration, it is possible to provide audio guidance with higher convenience without giving discomfort to the user.

Figure 9A:
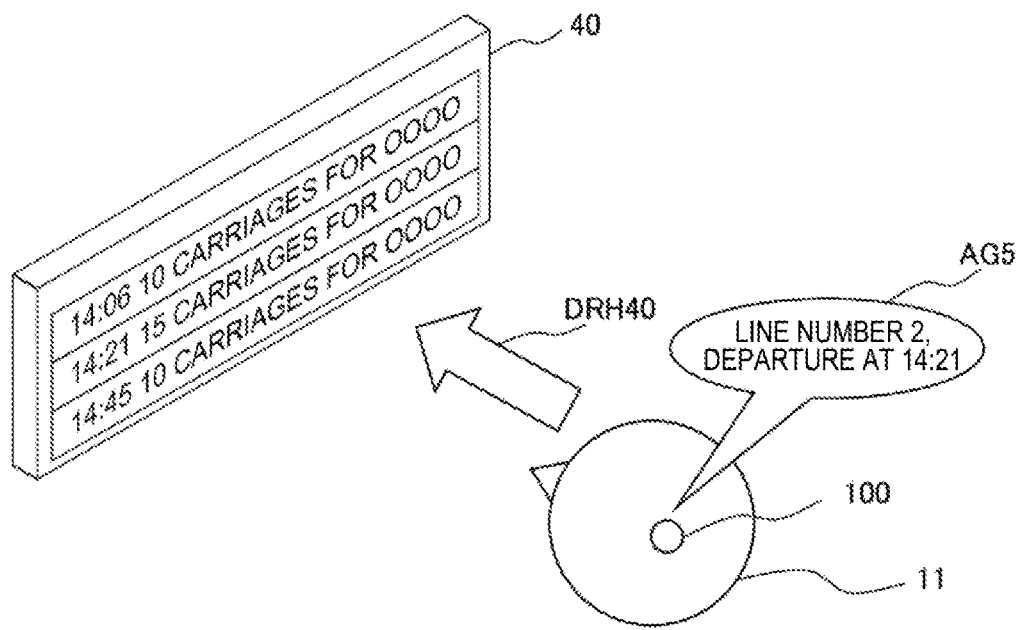
FIGS. 9A and 9B are diagrams schematically illustrating an audio information providing system according to a fourth embodiment of the invention.
Figure 9B:
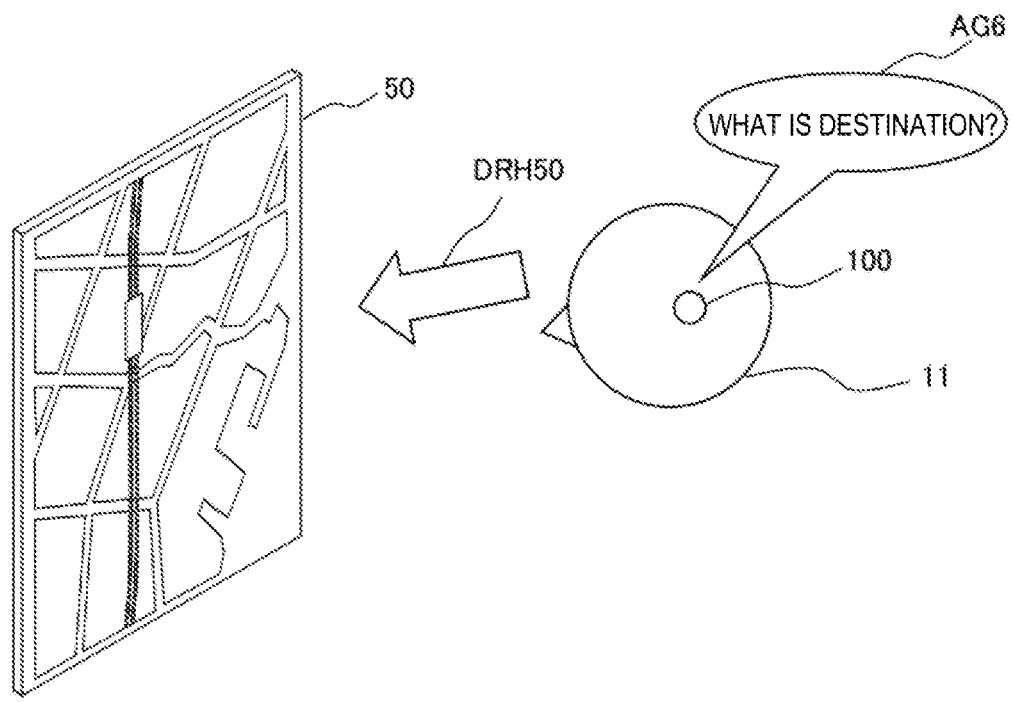

A fourth embodiment of the invention will be described below with reference to FIGS. 9A and 9B. In the fourth embodiment, the generation unit 240 generates audio data on the basis of information on a current position of a user and a direction of a sight line of the user when the sight line of the user based on information on a direction of the head of the user detected by the detection unit 150 is directed to a predetermined point for a predetermined time or more. Accordingly, audio guidance is generated on the basis of the user's situation which is determined on the basis of the current position of the user and the information on the direction of the head of the user.

A specific example will be described below. FIG. 9A is a diagram illustrating a state in which a user 10 ascertains an electric bulletin board 40 in a station. It can be determined that the user 10 is located in the station using the position information acquiring unit 230. When the direction of the head of the user 10 is maintained in the direction DRH40 for a predetermined time or more, the generation unit 240 of the information processing terminal 200 generates audio data (audio guidance AG5 of "line number 2 of departure at 14:21") based on the position information ("station") of the user and the direction of the head ("upward"). FIG. 9B is a diagram illustrating a scene in which the user 10 checks a map 50. In this case, the generation unit 240 generates audio data (audio guidance AG6 of "what is a destination?") based on a combination of the position information of the user ("forward in the map") and the direction of the head ("obliquely downward").

Audio data which is to be generated on the basis of the position information and the direction of the head is stored in the storage unit 260 (or the storage unit 340) in advance. Audio data which is to be generated may also be changed on the basis of a current time, whether an application program is started in the information processing terminal 200, a past behavior history of the user, the movement direction, the current position, and the like. For example, position information is "station" and the direction of the head is "upward" is considered. When a route guidance application program is started in the information processing terminal 200 and a destination is set, audio data "line number 2 of departure at 14:21" associated with the destination may be generated. Audio data "arrives at OO station at 15:50" associated with an arrival time may be generated on the basis of the current time. When a route guidance application program is not started, audio data for inquiring about whether route guidance is necessary, such as "Is route guidance to be started?" or "Where are you going?" may be generated. Audio data "OO line is delayed" associated with a station may be generated. In addition, audio data which is stored in the storage unit 260 may be learned and generated on the basis of a behavior history of the user or the like.

In the related art, there is a service in which a beacon is attached to an entrance or a signboard of a store and coupon information, points, or the like are transmitted to an information processing terminal capable of receiving a beacon. When this service is applied to a hearable device, various types of audio information are output to ears, which is inconvenient. In this case, only audio information associated with a position at which the user gazes can be output on the basis of information capable of determining a "gaze" of a user as in the fourth embodiment.

The reception unit 211 of the information processing terminal 200 receives information on external audio information associated with a predetermined external service. The generation unit 240 selects external audio data associated with a place at which the user is determined to gaze as audio data on the basis of the direction of the head of the user. The external audio data may be directly received from an external device that transmits the external audio data, or may be received from a predetermined server on the basis of link information (for example, URL information) from which the external audio data can be acquired.

In the fourth embodiment, it can also be considered that a user gazes at a certain point while moving (for example, on an escalator, on foot, or in a vehicle). In this case, when it is determined that a sight line of the user is directed to a certain point on the basis of a relationship between the moving speed of the user and the rotational angle (an angular velocity or acceleration) of the head of the user, audio data can be generated as described above.

A fifth embodiment will be described below. In the fifth embodiment, information on a relationship between a direction of the head of a user and position information which is described above in the first to fourth embodiments is transmitted to the server 300 in correlation. The determination unit 330 of the server 300 receives the information from a plurality of users and determines a place on which sight lines of a plurality of users are concentrated on a three-dimensional map. Here, a three-dimensional map is not particularly limited in format as long as it is a data group in which geographical features are expressed in a three dimension, and may not be in the form of a map.

For example, it is currently assumed that visual information such as signboards or posters is provided in various places such as a station yard, a rooftop or a yard of a building, and inside of a train. According to the fifth embodiment, information on degrees of attention of a plurality of users (whether sight lines are attracted) on the visual information can be acquired as data.

FIG. 10 is a sequence diagram illustrating a sequence of processes which are performed by the audio output device 100, the information processing terminal 200, and the server 300 in the fifth embodiment. First, in the audio output device 100, a direction of ahead of a user is detected and is transmitted to the information processing terminal 200 (Step T10). In the information processing terminal 200, position information of the user is acquired (Step T11). The information processing terminal 200 transmits the current position of the user and the direction of the head of the user to the server 300 in correlation (Step T12). The server 300 determines a place on which sight lines of a plurality of users are concentrated on a three-dimensional map on the basis of information on the current position and the direction of the head which are received from a plurality of users (Step T13).

As for the above visual information, it may be determined where a sight line of a user is directed, for example, by analyzing an image from a camera which is installed in the vicinity thereof. However, since places in which a camera can be installed are limited from the point of view of personal information or due to a limitation of an installation place, there is a problem in that satisfactory data cannot be acquired. On the other hand, with a hearable device according to an embodiment of the invention, it is possible to attract directions of sight lines of users in all places and to acquire information with higher accuracy.

While the invention has been described above with reference to all the drawings or embodiments, it should be noted that those skilled in the art can easily perform various modifications or corrections on the basis of the present disclosure. Accordingly, it should be noted that these modifications or corrections are included in the scope of the invention. For example, the constituent units and the functions included in the steps can be rearranged unless logical contradictions arise, and a plurality of constituent units or steps may be combined into a single constituent unit or step or may be divided. The configurations described in the above embodiments may be appropriately combined. For example, the constituent units which are described as being included in the server 300 may be distributed to and embodied by a plurality of servers. The processes which are described as the functions of the server 300 may be performed by the information processing terminal 200 or the audio output device 100. The processes which are described as the functions of the information processing terminal 200 may be performed by the audio output device 100.

For example, route guidance has been described above as an example, but audio data is not limited thereto and audio data associated with weather forecast, mail reading, or whether there is a voice call may be generated and output from a direction associated with the audio data.

The generation unit 240 may generate audio information in which sound is caused to slide in ears of a user 10 (sound image and sound field effects based on upward, downward, rightward, leftward, forward, or rearward movement of localization of sound or a change of a sound volume) with change in the direction of the head of the user on the basis of information on the direction of the head of the user 10 detected by the detection unit 150. For example, the generation unit 240 generates audio information in which a movement direction or balance in rightward, leftward, depth, and upward directions of audio is changed according to change in the direction of the head of the user 10 such that the user easily recognizes presence of speech and sound slides lightly in the user's ears. Accordingly, it is possible to provide audio with a comfortable feeling according to a direction of the head of a user and to give a stylish sense to a user.

The programs according to the embodiments of the present disclosure may be provided in a state in which they are stored in a computer-readable recording medium. The recording medium can store a program in a "non-transitory tangible medium." The program includes, for example, a software program or a computer program.

Examples of a storage medium include one or more semiconductor-based or other integrated circuits (IC) (for example, a field programmable gate array (FPGA) or an application-specific integrated circuit (ASIC)), a hard disk drive (HDD), a hybrid hard drive (HHD), an optical disc, an optical disc drive (ODD), a magneto-optical disc, a magneto-optical drive, a floppy diskette, a floppy disk drive (FDD), a magnetic tape, a solid state drive (SSD), a RAM driver, a secure digital card or drive, another arbitrary storage medium, and an appropriate combination of two or more thereof. For example, the storage medium may be a volatile medium, a nonvolatile medium, or a combination of volatile and nonvolatile mediums.

The program according to the present disclosure may be provided to the information processing terminal 200 via an arbitrary transmission medium (such as a communication network or broadcast waves) capable of transmitting the program.

The embodiments of the present disclosure may be realized in the form in which a program is realized by electronic transmission or in the form of a data signal which is embedded in carrier waves.

The program according to the present disclosure can be recorded, for example, using a script language such as Java Script (registered trademark) or Python, a C language, a Go language, Swift, Koltin, or Java (registered trademark).

EXPLANATION OF REFERENCES

- 100 Audio output device
- 200 Information processing terminal
- 300 Server
- 400 Network
- 410 Short-range radio communication
- 500 Audio information providing system
- 201 Processor
- 202 Memory
- 203 Storage
- 110 Communication control unit
- 120 Audio output unit
- 130 Audio input unit
- 140 Input receiving unit
- 150 Detection unit
- 210 Communication control unit
- 211 Reception unit
- 212 Transmission unit
- 220 Input/output control unit
- 230 Position information acquiring unit
- 240 Generation unit
- 250 Prediction unit
- 260 Storage unit
- 310 Communication control unit
- 320 Learning unit
- 330 Determination unit
- 340 Storage unit
- 10 User
- 11 Head
- 20 Destination
- 40 Electric bulletin board
- 50 Map

The invention claimed is:

1. An audio information providing system, comprising:
an audio output device that is worn in the ear of a user; and
an information processing terminal that is communicatively connected to the audio output device,
wherein the audio output device includes:
an audio output unit configured to output audio to the ear of the user; and
a detection unit configured to detect a direction of the head of the user, and
wherein the information processing terminal includes:
a position information acquiring unit configured to acquire a current position of the user;
a prediction unit configured to predict a stop position of a change of the direction of the head when the detection unit detects the start of the change of the direction of the head of the user on the basis of learned data associated with the direction of the head of the user which is stored in a predetermined storage device; and
a generation unit configured to generate audio data which is used for the audio output unit to output audio guidance for a route to a destination to which the user moves from a direction of the destination relative to the direction of the head of the user on the basis of a relationship among position information of the destination, the current position of the user, and information on the direction of the head of the user, using information on the stop position predicted by the prediction unit as the information on the direction of the head of the user.

2. The audio information providing system according to claim 1, wherein the generation unit is configured to generate the audio data additionally on the basis of information on movement of the user.

3. The audio information providing system according to claim 1, wherein the generation unit is configured to generate the audio data in which content of the audio guidance is changed on the basis of the direction of the head of the user acquired from the detection unit and information on a movement direction of the user.

4. The audio information providing system according to claim 1, wherein the generation unit is configured to generate the audio data on the basis of information on the current position of the user and a direction of a sight line of the user based on information on the direction of the head of the user detected by the detection unit when the sight line of the user is directed to a predetermined point for a predetermined time or more.

5. The audio information providing system according to claim 1,
wherein the information processing terminal further includes a reception unit configured to receive information on external audio data associated with a predetermined external service, and
wherein the generation unit is configured to select the external audio data as the audio data which is output from the audio output unit on the basis of the direction of the head of the user.

6. The audio information providing system according to claim 1,
wherein the information processing terminal further includes a transmission unit configured to transmit the position information of the user and the information on the direction of the head of the user in the position information to a predetermined information processing device in correlation with each other, and wherein the predetermined information processing device includes a determination unit configured to determine a place on which sight lines of a plurality of users are concentrated on a three-dimensional map on the basis of the position information of the plurality of users and the information on the directions of the heads thereof.

7. An audio information providing system, comprising:
an audio output device that is worn in the ear of a user; and
an information processing terminal that is communicatively connected to the audio output device,
wherein the audio output device includes:
  an audio output unit configured to output audio to the ear of the user; and
  a detection unit configured to detect a direction of the head of the user, and
wherein the information processing terminal includes:
  a position information acquiring unit configured to acquire a current position of the user; and
  a generation unit configured to generate audio data which is used for the audio output unit to output audio guidance for a route to a destination to which the user moves from a direction of the destination relative to the direction of the head of the user on the basis of:
    a relationship among position information of the destination, the current position of the user, and information on the direction of the head of the user; and
    information on the current position of the user and a direction of a sight line of the user based on information on the direction of the head of the user detected by the detection unit when the sight line of the user is directed to a predetermined point for a predetermined time or more.

8. The audio information providing system according to claim 7,
wherein the information processing terminal further includes a prediction unit configured to predict a stop position of a change of the direction of the head when the detection unit detects the start of the change of the direction of the head of the user, and
wherein the generation unit is configured to generate the audio data using information on the stop position predicted by the prediction unit as the information on the direction of the head of the user.

9. The audio information providing system according to claim 8, wherein the prediction unit is configured to predict the stop position of a change of the direction of the head on the basis of learned data associated with the direction of the head of the user which is stored in a predetermined storage device.

10. The audio information providing system according to claim 7, wherein the generation unit is configured to generate the audio data additionally on the basis of information on movement of the user.

11. The audio information providing system according to claim 7, wherein the generation unit is configured to generate the audio data in which content of the audio guidance is changed on the basis of the direction of the head of the user acquired from the detection unit and information on a movement direction of the user.

12. The audio information providing system according to claim 7,
wherein the information processing terminal further includes a reception unit configured to receive information on external audio data associated with a predetermined external service, and
wherein the generation unit is configured to select the external audio data as the audio data which is output from the audio output unit on the basis of the direction of the head of the user.

13. The audio information providing system according to claim 7,
wherein the information processing terminal further includes a transmission unit configured to transmit the position information of the user and the information on the direction of the head of the user in the position information to a predetermined information processing device in correlation with each other, and
wherein the predetermined information processing device includes a determination unit configured to determine a place on which sight lines of a plurality of users are concentrated on a three-dimensional map on the basis of the position information of the plurality of users and the information on the directions of the heads thereof.

14. An audio information providing system, comprising:
an audio output device that is worn in the ear of a user; and
an information processing terminal that is communicatively connected to the audio output device,
wherein the audio output device includes:
  an audio output unit configured to output audio to the ear of the user; and
  a detection unit configured to detect a direction of the head of the user,
wherein the information processing terminal includes:
  a position information acquiring unit configured to acquire a current position of the user;
  a generation unit configured to generate audio data which is used for the audio output unit to output audio guidance for a route to a destination to which the user moves from a direction of the destination relative to the direction of the head of the user on the basis of a relationship among position information of the destination, the current position of the user, and information on the direction of the head of the user; and
  a transmission unit configured to transmit the position information of the user and the information on the direction of the head of the user in the position information to a predetermined information processing device in correlation with each other, and
wherein the predetermined information processing device includes a determination unit configured to determine a place on which sight lines of a plurality of users are concentrated on a three-dimensional map on the basis of the position information of the plurality of users and the information on the directions of the heads thereof.

15. The audio information providing system according to claim 14,
wherein the information processing terminal further includes a prediction unit configured to predict a stop position of a change of the direction of the head when the detection unit detects the start of the change of the direction of the head of the user, and
wherein the generation unit is configured to generate the audio data using information on the stop position predicted by the prediction unit as the information on the direction of the head of the user.

16. The audio information providing system according to claim 15, wherein the prediction unit is configured to predict the stop position of a change of the direction of the head on the basis of learned data associated with the direction of the head of the user which is stored in a predetermined storage device.

17. The audio information providing system according to claim 14, wherein the generation unit is configured to generate the audio data additionally on the basis of information on movement of the user.

18. The audio information providing system according to claim 14, wherein the generation unit is configured to generate the audio data in which content of the audio guidance is changed on the basis of the direction of the head of the user acquired from the detection unit and information on a movement direction of the user.

19. The audio information providing system according to claim 14, wherein the generation unit is configured to generate the audio data on the basis of information on the current position of the user and a direction of a sight line of the user based on information on the direction of the head of the user detected by the detection unit when the sight line of the user is directed to a predetermined point for a predetermined time or more.

20. The audio information providing system according to claim 14,
wherein the information processing terminal further includes a reception unit configured to receive information on external audio data associated with a predetermined external service, and
wherein the generation unit is configured to select the external audio data as the audio data which is output from the audio output unit on the basis of the direction of the head of the user.

* * * * *